US009479575B2

(12) United States Patent
Olsen et al.

(10) Patent No.: US 9,479,575 B2
(45) Date of Patent: Oct. 25, 2016

(54) MANAGING CAPACITY ON DEMAND IN A SERVER CLOUD

(75) Inventors: Paul F. Olsen, Rochester, MN (US); Terry L. Schardt, Oronoco, MN (US)

(73) Assignee: International Business Machines Corporation, Armonk, NY (US)

( * ) Notice: Subject to any disclaimer, the term of this patent is extended or adjusted under 35 U.S.C. 154(b) by 818 days.

(21) Appl. No.: 13/431,689

(22) Filed: Mar. 27, 2012

(65) Prior Publication Data

US 2013/0262677 A1 Oct. 3, 2013

(51) Int. Cl.
*G06F 15/173* (2006.01)
*H04L 29/08* (2006.01)
*G06F 9/50* (2006.01)
*H04L 12/24* (2006.01)

(52) U.S. Cl.
CPC ......... *H04L 67/1031* (2013.01); *G06F 9/5027* (2013.01); *H04L 67/1097* (2013.01); *H04L 41/5096* (2013.01)

(58) Field of Classification Search
CPC .................................... G06F 15/173
See application file for complete search history.

(56) References Cited

U.S. PATENT DOCUMENTS

| | | | |
|---|---|---|---|
| 6,990,666 B2* | 1/2006 | Hirschfeld et al. | 718/104 |
| 7,451,183 B2 | 11/2008 | Romero et al. | |
| 7,603,670 B1 | 10/2009 | van Rietschote | |
| 8,037,187 B2 | 10/2011 | Dawson et al. | |
| 8,464,255 B2* | 6/2013 | Nathuji et al. | 718/1 |
| 8,468,227 B2 | 6/2013 | Vasudevan et al. | |
| 2006/0116897 A1* | 6/2006 | Yoshida et al. | 705/1 |
| 2009/0150463 A1 | 6/2009 | Sekiguchi et al. | |
| 2011/0138055 A1* | 6/2011 | Daly et al. | 709/226 |
| 2011/0145153 A1 | 6/2011 | Dawson et al. | |
| 2011/0145392 A1* | 6/2011 | Dawson et al. | 709/224 |
| 2011/0179132 A1* | 7/2011 | Mayo et al. | 709/213 |
| 2011/0238460 A1 | 9/2011 | Al-Dawsari et al. | |
| 2012/0042256 A1 | 2/2012 | Jamjoom et al. | |
| 2013/0205027 A1* | 8/2013 | Abuelsaad et al. | 709/226 |
| 2014/0149529 A1 | 5/2014 | McLellan et al. | |
| 2014/0298444 A1 | 10/2014 | Iwamatsu et al. | |

FOREIGN PATENT DOCUMENTS

| | | | |
|---|---|---|---|
| CA | WO2011050482 A1 | 5/2011 | |
| JP | 2004288183 A | 10/2004 | |
| JP | 2010178381 A | 8/2010 | |

OTHER PUBLICATIONS

NPL1: Title: G-Store: A Scalable Data Store for Transactional Multi key Access in the Cloud 2010, Sudipto Das, Divyakant Agrawal, Amr El Abbadi Department of Computer Science, University of California, Santa Barbara Santa Barbara, CA 93106-5110, USA.*

(Continued)

*Primary Examiner* — Joshua Joo
(74) *Attorney, Agent, or Firm* — Martin & Associates, LLC; Derek P. Martin

(57) ABSTRACT

A cloud capacity on demand manager manages capacity on demand for servers in a server cloud. The cloud capacity on demand manager may borrow capacity from one or more servers and lend the capacity borrowed from one server to a different server in the server cloud. When the server cloud is no longer intact, capacity borrowed from servers no longer in the server cloud is disabled, and servers no longer in the server cloud reclaim capacity that was lent to the server cloud.

9 Claims, 9 Drawing Sheets

(56) References Cited

OTHER PUBLICATIONS

H-C. Li et al., "Analysis on Cloud-Based Security Vulnerability Assessment," Proceedings IEEE 7th Intn'l Conference on E-Business Engineering(ICEBE); pp. 490-494; 2010.

IBM Corporation, "System i and System p—Capacity on Demand"; publib.boulder.ibm.com/infocenter/systems/scope/ipha2book . . . ; Oct. 2007.

S. Devenish et al., "IBM Power VM Virtualization—Introduction and Configuration," IBM Corporation, ibm.com/redbooks/sg247940-04 . . . ; Nov. 2010.

Intel Corporation, "Implementing On-Demand Services Inside the Intel IT Private Cloud," www.intel.com/DOC5911 . . . Intel IT Best Practices; Oct. 2010.

Tsuneo Katsuyama et al., "Integrated Management of Data Centers and Networks for Proactive Operation Management," Fujitsu Limited, vol. 54, No. 5, Sep. 10, 2003, pp. 396-401.

Kawai Yasuhiro, New Century Project, The Future of Japan-type IT Revolution, Site Construction at Broadband Age, Pursuing System Which Can Completely Take Care of High Capacity Traffic, NIKKEI Internet Technology, Japan, NIKKEI BP Co., Aug. 8, 2001, 22nd, No. 50, pp. 46-49.

\* cited by examiner

| Cloud Resource Table | | | |
|---|---|---|---|
| Capacity ID | Resource Type | Owner | Lent To |
| P3 | Processor | Server A | |
| ⋮ | ⋮ | ⋮ | ⋮ |
| P14 | Processor | Server C | Server D |

MANAGING CAPACITY ON DEMAND IN A SERVER CLOUD

BACKGROUND

1. Technical Field

This disclosure generally relates to computer systems, and more specifically relates to managing capacity on demand with multiple servers in a server cloud.

2. Background Art

One problem with computer systems today is balancing the cost of the computer hardware with fluctuating demands on computer resources. In most networked computer systems, there are times when the computing demands are relatively low, and other times when the computing demands are very high. If a company purchases a computer system that is capable of meeting peak demand, much of the capacity of the computer system will go unused during non-peak times. In addition, purchasing capacity to meet peak demand is costly. If a company purchases a computer system that is capable of meeting average demand, the cost is lower, but the performance of the computer system suffers during peak times.

One way to provide a more flexible solution allows a computer user to buy a computer system that has some resources installed, but initially disabled. When the customer determines that more capacity is needed, the customer may enter into an arrangement with the provider of the computer system to enable certain resources for a fixed period of time. This works out particularly well for companies that have seasonal peaks. The companies can purchase a computer system at a reasonable cost that has the capability of providing enhanced computing power during the peak season. The ability to purchase additional capacity when needed is known as Capacity On Demand.

A simple example will illustrate. Let's assume that a company that sells goods via catalog sales experiences peak demand in November and December of each year due to holiday shopping. The company could purchase a computer system that has one or more additional processors that are installed but initially disabled. The company may then contract with the provider of the computer system to enable the additional processor(s) for a set period of time. Let's assume that the computer system has two additional processors, and let's assume that the peak buying period runs for the thirty day period from November 15$^{th}$ to December 14$^{th}$. The customer could purchase sixty processor-days of additional capacity beginning on November 15$^{th}$. These two additional processors will then be enabled for the thirty day period (providing the sixty processor-days of additional capacity). Once the sixty processor-days have elapsed, the two additional processors are disabled.

Sever clouds allow different server computer systems to work together. Each server may have additional resources (such as processors, memory, etc.) that are installed but not enabled, but may be enabled as needed on a Capacity On Demand basis. However, even though the servers in a cloud may communicate and cooperate in processing a job, the Capacity On Demand capabilities of each server are separate and distinct from all other servers. Thus, if a server has a compute-intensive job to process and needs additional processor capacity, it does so in a manner based on its own available processor capacity, without regard to the other servers in the server cloud.

BRIEF SUMMARY

A cloud capacity on demand manager manages capacity on demand for servers in a server cloud. The cloud capacity on demand manager may borrow capacity from one or more servers and lends the capacity borrowed from one server to a different server in the server cloud. When the server cloud is no longer intact, capacity borrowed from servers no longer in the server cloud is disabled, and servers no longer in the server cloud reclaim capacity that was lent to the server cloud.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

DETAILED DESCRIPTION

The claims and disclosure herein provide a cloud capacity on demand manager that manages capacity on demand for servers in a server cloud. The cloud capacity on demand manager may borrow capacity from one or more servers and lend the capacity borrowed from one server to a different server in the server cloud. When the server cloud is no longer intact, capacity borrowed from servers no longer in the server cloud is disabled, and servers no longer in the server cloud reclaim capacity that was lent to the server cloud.

Figure 1:
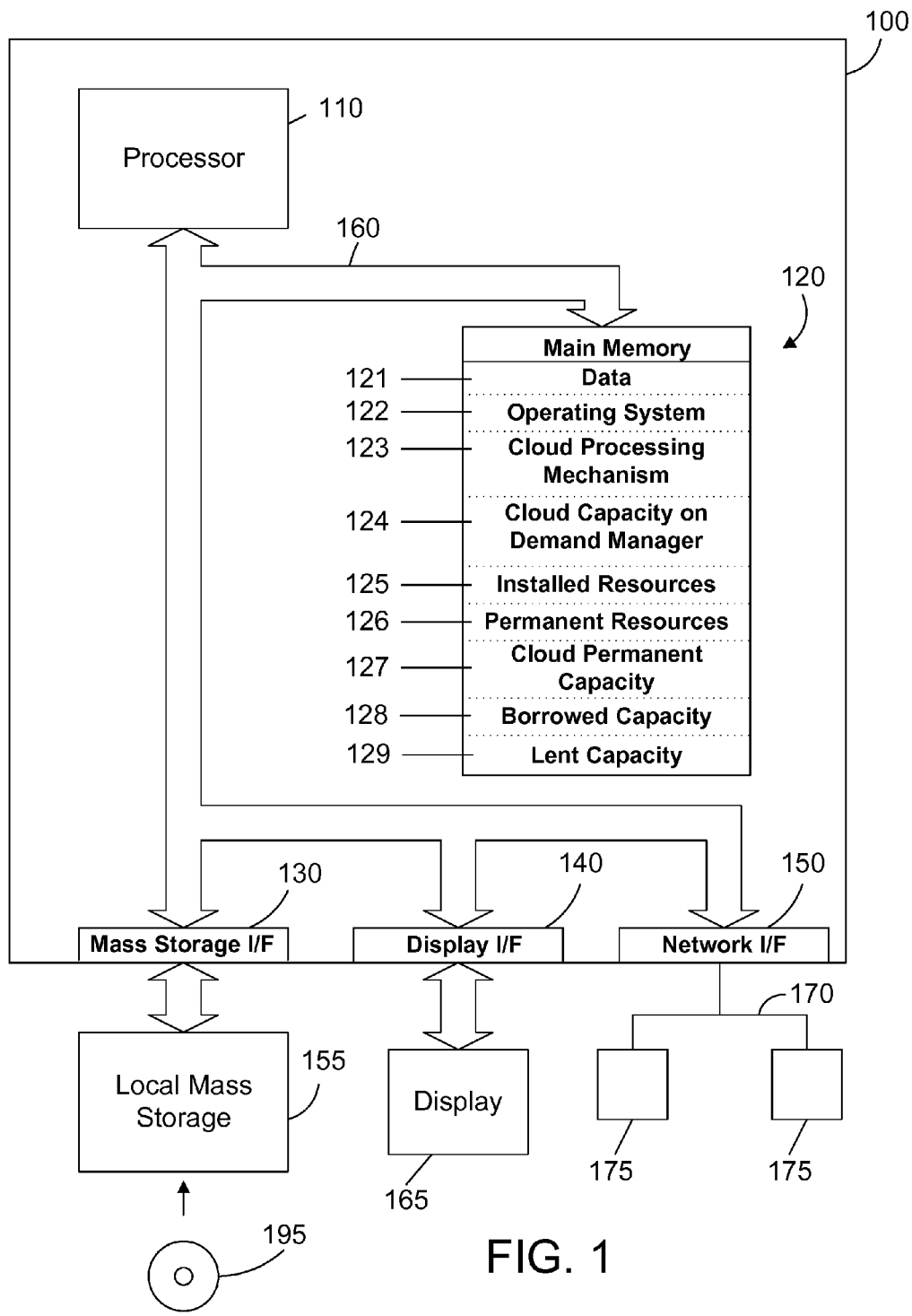
FIG. 1 is a block diagram of an apparatus that includes a cloud capacity on demand manager.

Referring to FIG. 1, a computer system 100 is one suitable implementation of a server computer system that includes a cloud capacity on demand manager. Server computer system 100 is an IBM eServer System x computer system. However, those skilled in the art will appreciate that the disclosure herein applies equally to any computer system, regardless of whether the computer system is a complicated multi-user computing apparatus, a single user workstation, or an embedded control system. As shown in FIG. 1, computer system 100 comprises one or more processors 110, a main memory 120, a mass storage interface 130, a display interface 140, and a network interface 150. These system components are interconnected through the use of a system bus 160. Mass storage interface 130 is used to connect mass storage devices, such as local mass storage device 155, to computer system 100. One specific type of local mass storage device 155 is a readable and writable CD-RW drive, which may store data to and read data from a CD-RW 195.

Main memory 120 preferably contains data 121, an operating system 122, a cloud processing mechanism 123, a cloud capacity on demand manager 124, installed resources 125, permanent resources 126, cloud permanent resources 127, borrowed resources 128, and lent resources 129. Data 121 represents any data that serves as input to or output from any program in computer system 100. Operating system 122 is a multitasking operating system. Cloud processing mechanism 123 is software that supports cooperation between server 100 and other servers in a server cloud. Cloud capacity on demand manager 124 manages capacity on demand for servers in a server cloud, and may borrow capacity from one server and lend that capacity to a different server. Installed resources 125 include resources installed in the server 100, whether enabled for use or not. Permanent resources 126 include resources permanently enabled on the server 100. Cloud permanent capacity 127 includes capacity for resources permanently enabled to any server in a server cloud of which server 100 is a member. Borrowed capacity 128 includes capacity for resources borrowed from other servers in a server cloud by server 100. Lent capacity 129 includes capacity for resources lent by server 100 to other servers in a server cloud. By borrowing capacity from other servers in a server cloud, the cloud capacity on demand manager 124 provides greater flexibility and lower cost for operating with additional resources in a server cloud.

Computer system 100 utilizes well known virtual addressing mechanisms that allow the programs of computer system 100 to behave as if they only have access to a large, contiguous address space instead of access to multiple, smaller storage entities such as main memory 120 and local mass storage device 155. Therefore, while data 121, operating system 122, cloud processing mechanism 123, cloud capacity on demand manager 124, installed resources 125, permanent resources 126, cloud permanent capacity 127, borrowed capacity 128, and lent capacity 129 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Processor 110 also executes the cloud capacity on demand manager 124.

Although computer system 100 is shown to contain only a single processor and a single system bus, those skilled in the art will appreciate that a cloud capacity on demand manager may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect computer system 100 to other computer systems or workstations 175 via network 170. Network interface 150 broadly represents any suitable way to interconnect electronic devices, regardless of whether the network 170 comprises present-day analog and/or digital techniques or via some networking mechanism of the future. Network interface 150 preferably includes a combination of hardware and software that allow communicating on the network 170. Software in the network interface 150 preferably includes a communication manager that manages communication with other computer systems 175 via network 170 using a suitable network protocol. Many different network protocols can be used to implement a network. These protocols are specialized computer programs that allow computers to communicate across a network. TCP/IP (Transmission Control Protocol/Internet Protocol) is an example of a suitable network protocol that may be used by the communication manager within the network interface 150.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language, Streams Processing language, or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The methods disclosed herein may be performed as part of providing a web-based service. Such a service could include, for example, offering the method to online users in exchange for payment.

Figure 2:
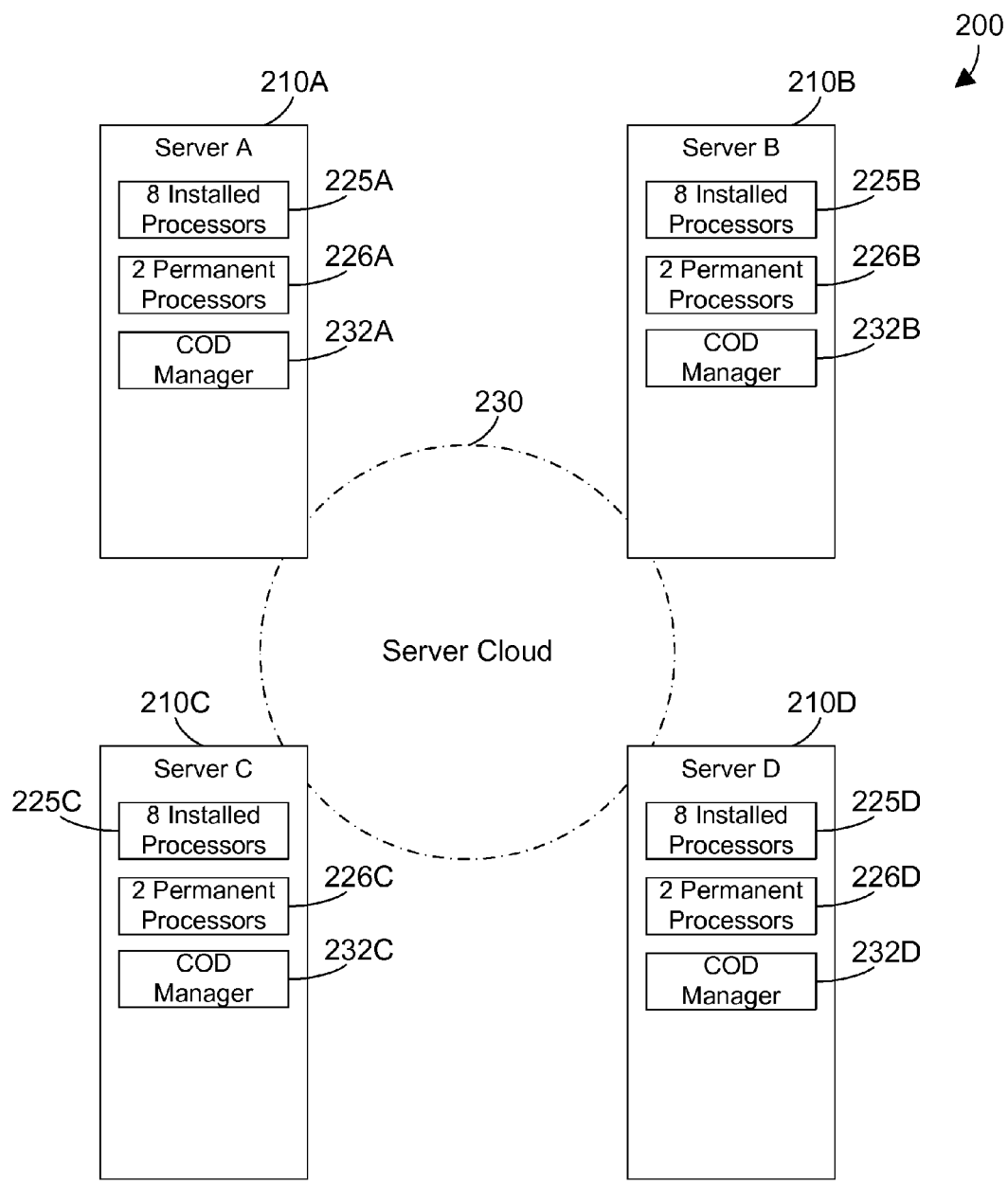
FIG. 2 is a block diagram of an example prior art server cloud system that includes four servers that each have a capacity on demand manager.

Referring to FIG. 2, a sample prior art configuration of servers in a server cloud is shown as server cloud system 200. Server cloud system 200 includes four servers 210A-210D all interconnected via some networking mechanism in a server cloud 230. Each server includes installed processors and permanent processors, where the installed processors specifies the number of processors physically installed on the server and the number of permanent processors specifies the number of processors permanently enabled on the server. For the specific example in FIG. 2, each server includes eight installed processors and two permanent processors, as shown at 225A-225D and 226A-226D. In the prior art server cloud system 200, each server includes its own capacity on demand manager 232A-232D that may increase the capacity of each server by known methods for providing capacity on demand. However, the capacity on demand manager for each server is handled independently from capacity on other servers in the server cloud 230. Thus, the function of each capacity on demand server 232A-232D is no different when the server is part of the server cloud 230 than when the server is not part of the server cloud 230.

Figure 3:
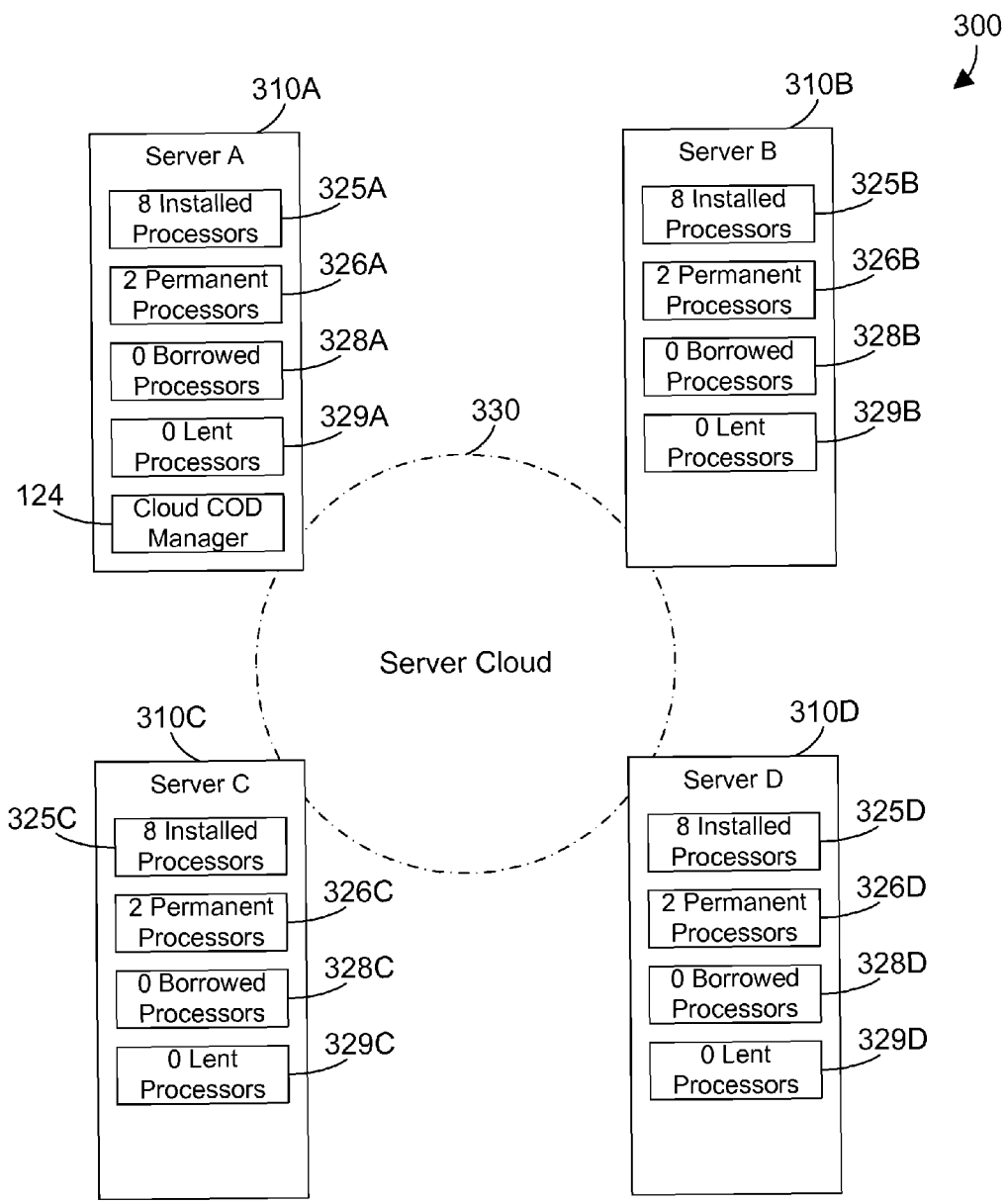
FIG. 3 is a block diagram of a server cloud system that includes a cloud capacity on demand manager.

FIG. 3 shows a server cloud system 300 similar in some respects to the prior art server cloud system 200. Server cloud system 300 includes four servers 310A-310D interconnected via some networking mechanism in a server cloud 330. Servers 310A-310D could each be a server computer system 100 as shown in FIG. 1. Each server includes eight installed processors 325A-325D and two permanent processors 326A-326D. However, server 310A additionally includes a cloud capacity on demand manager 124 that manages capacity on demand for the servers in the server cloud, and can borrow capacity from one server to be lent to another server when needed. Because each server 310A-310D may both borrow capacity and lend capacity, each server tracks borrowed processors 328A-328D and lent processors 329A-329D. While 328A-328D are shown as "borrowed processors" in FIG. 3, it is actually the capacity for the processors that is borrowed. Similarly, while 329A-329D are shown as "lent processors" in FIG. 3, it is actually the capacity for the processors that is lent. The configuration shown in FIG. 3 assumes each server can handle its own processing load with its two permanent processors.

Figure 4:
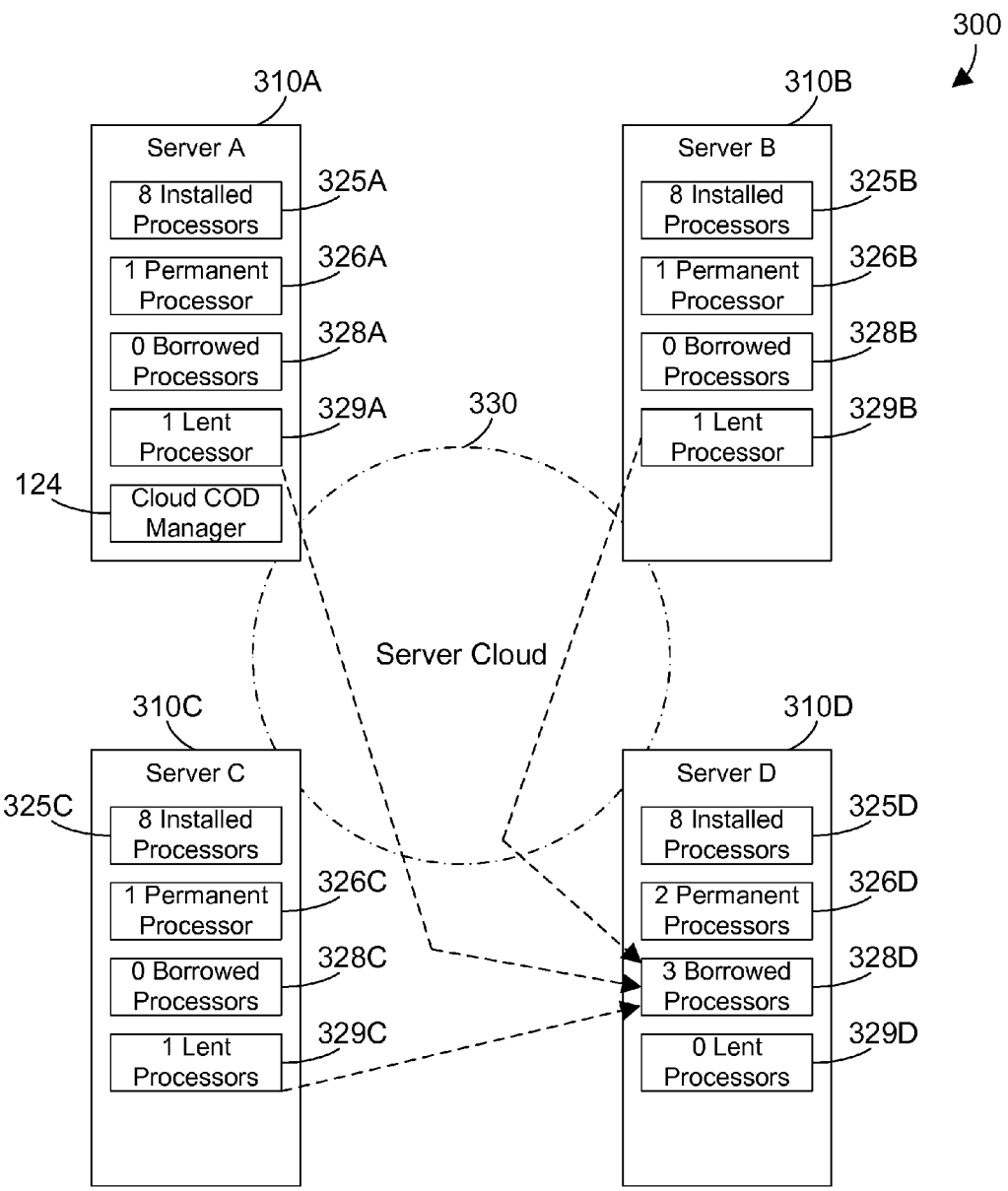
FIG. 4 is a block diagram of the server cloud system in FIG. 3 showing capacity shared between servers in the server cloud.

Now turning to FIG. 4, we assume for this example that server 310D has need for additional processor capacity due to an increased processing load, and we further assume server 310D needs capacity for three additional processors in addition to the two permanent processors 326D already enabled. In the prior art, a capacity on demand manager on server 310D could enable three more of the installed processors, resulting in a total of five permanent processors on server 310D. However, the cloud capacity on demand manager 124 recognizes that there may be unused capacity in the server cloud that could be temporarily borrowed from one or more servers in the server cloud and lent to server 310D. For the specific example in FIG. 4, we assume that each of servers 310A, 310B and 310C can process their workloads using one of the two permanent processors on each server, which means each has capacity of one processor that could be lent to the server 310D that needs additional capacity. Thus, the cloud capacity on demand manager 124 reduces the number of permanent processors from two to one as shown at 326A-326C in FIG. 4, and increases the number of lent processors from zero to one as shown at 329A-329C in FIG. 4. The cloud capacity on demand manager may then lend the capacity of these lent processors 329A-329C to server 310D, as shown by the dotted lines with arrows providing three borrowed processors 328D in FIG. 4. Note that what is lent and borrowed in FIG. 4 is processor capacity. Thus, the total number of processors enabled in the server cloud system 300 shown in FIG. 3 is two permanent processors 326A-326B on each of the four servers, for a total of eight enabled processors. The total number of processors enabled in the serer cloud system 300 shown in FIG. 3 is still eight, one permanent processor 326A-326C from each of three servers, two permanent processors 326D on server 310D, and three borrowed processors 328D on server 310D. The ability of the cloud capacity on demand manager to borrow capacity from one server and lend that capacity to a different server in the server cloud provides a system that is incredibly flexible and will allow a customer to utilize unused capacity on servers instead of purchasing additional capacity for a particular server. The result is a system that uses total capacity in the server cloud more efficiently and in a more cost-effective manner.

Figure 5:
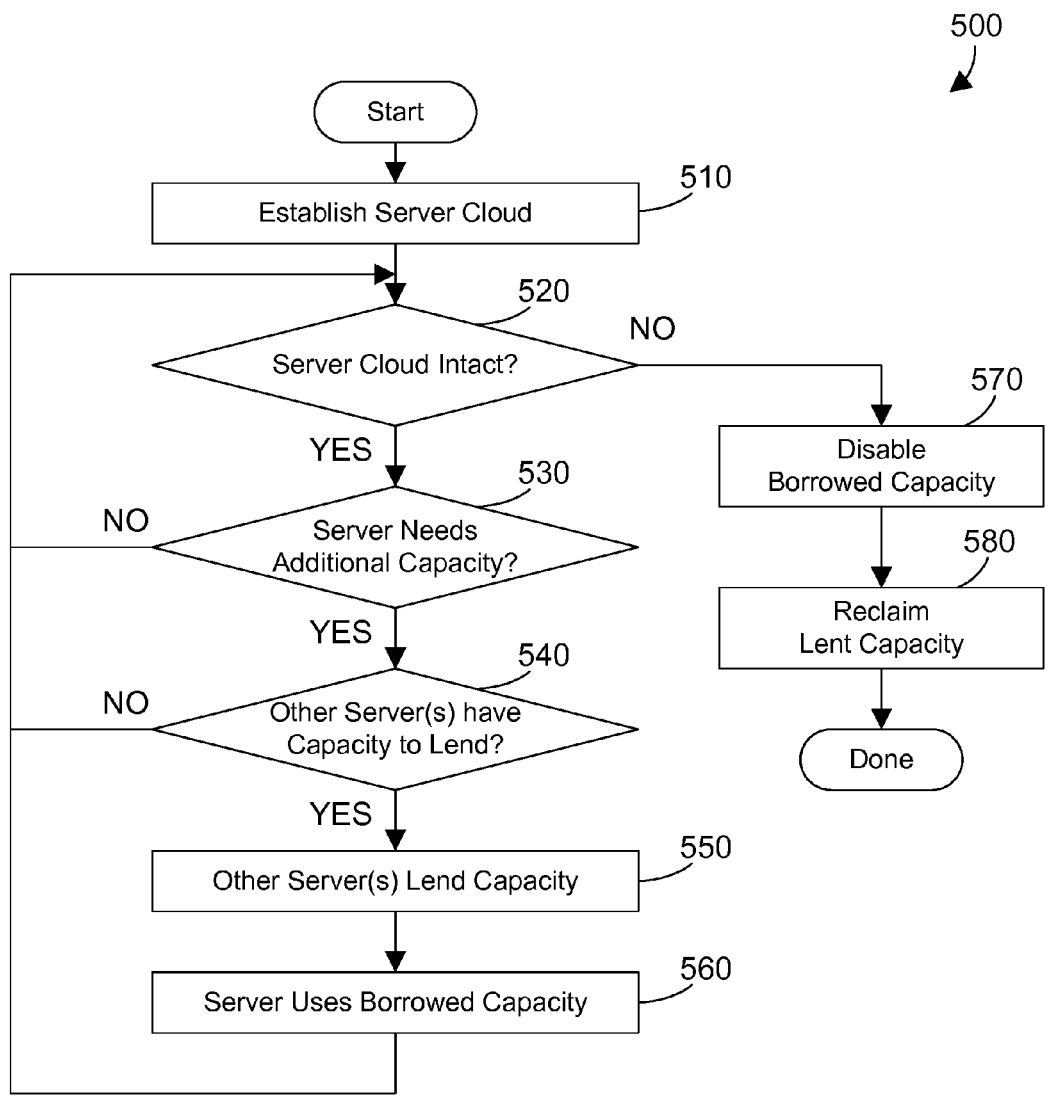
FIG. 5 is a flow diagram of a method for sharing capacity between servers in a server cloud.

Referring to FIG. 5, a method 500 begins when a server cloud is established (step 510). When the server cloud is intact (step 520=YES), when a server in the server cloud needs additional capacity (step 530=YES), and when one or more other servers in the server cloud have capacity to lend (step 540=YES), one or more other servers lend capacity (step 550), and the server uses the borrowed capacity (step 560). When no server in the server cloud needs additional capacity (step 530=NO), method 500 loops back to step 520 and continues. Similarly, when no other server has capacity to lend (step 540=NO), method 500 loops back to step 520 and continues. Method 500 may continue until the server cloud is no longer intact (step 520=NO), at which point the borrowed capacity is disabled (step 570), and the lent capacity is reclaimed (step 580). Note that steps 570 and 580 may function in two different manners. In a first implementation, when the server cloud is no longer intact (step 520=NO) due to one server no longer being a member of the server cloud, the borrowed capacity on all servers in the server cloud is disabled in step 570 and the lent capacity on all servers in the server cloud is reclaimed. In a second implementation, when the server cloud is no longer intact (step 520=NO) due to one server (lost server) no longer being a member of the server cloud, the borrowed capacity for the lost server is disabled in step 570 in any server that is still in the server cloud that had borrowed capacity from the lost server, and the lost server reclaims the lent capacity in step 580 when it detects it is no longer a member of the server cloud. The first implementation is an all-or-nothing approach, where the loss of any server in the server cloud causes all borrowed capacity to be disabled and all lent capacity to be reclaimed. The second implementation selectively disables borrowed capacity from the lost server and reclaims lent capacity on the lost server, while allowing the remainder of servers in the server cloud to function with borrowed and lent capacity that is not affected by the loss of the lost server.

In step 520, the determination of whether the server cloud is intact may be made in any suitable way. For example, in one specific implementation, a token is circulated between the servers in the server cloud to maintain the server cloud. If a server does not send its token within a defined period of time, it is assumed the server is no longer functioning properly, which means the server cloud is no longer intact. In an alternative implementation, the cloud capacity on demand manager may log the members of the server cloud, and may periodically interrogate each server in the server cloud. If each server responds with an appropriate response, the cloud capacity on demand manager knows the server cloud is still intact. If one of the servers does not respond, the cloud capacity on demand manager knows the server that did not respond is not functioning properly, and is therefore no longer in the server cloud. The cloud capacity on demand manager may then take action as discussed above to disable borrowed capacity and reclaim lent capacity. The disclosure and claims herein extend to any suitable method for determining whether a server cloud is intact, whether currently known or developed in the future.

Figure 6:
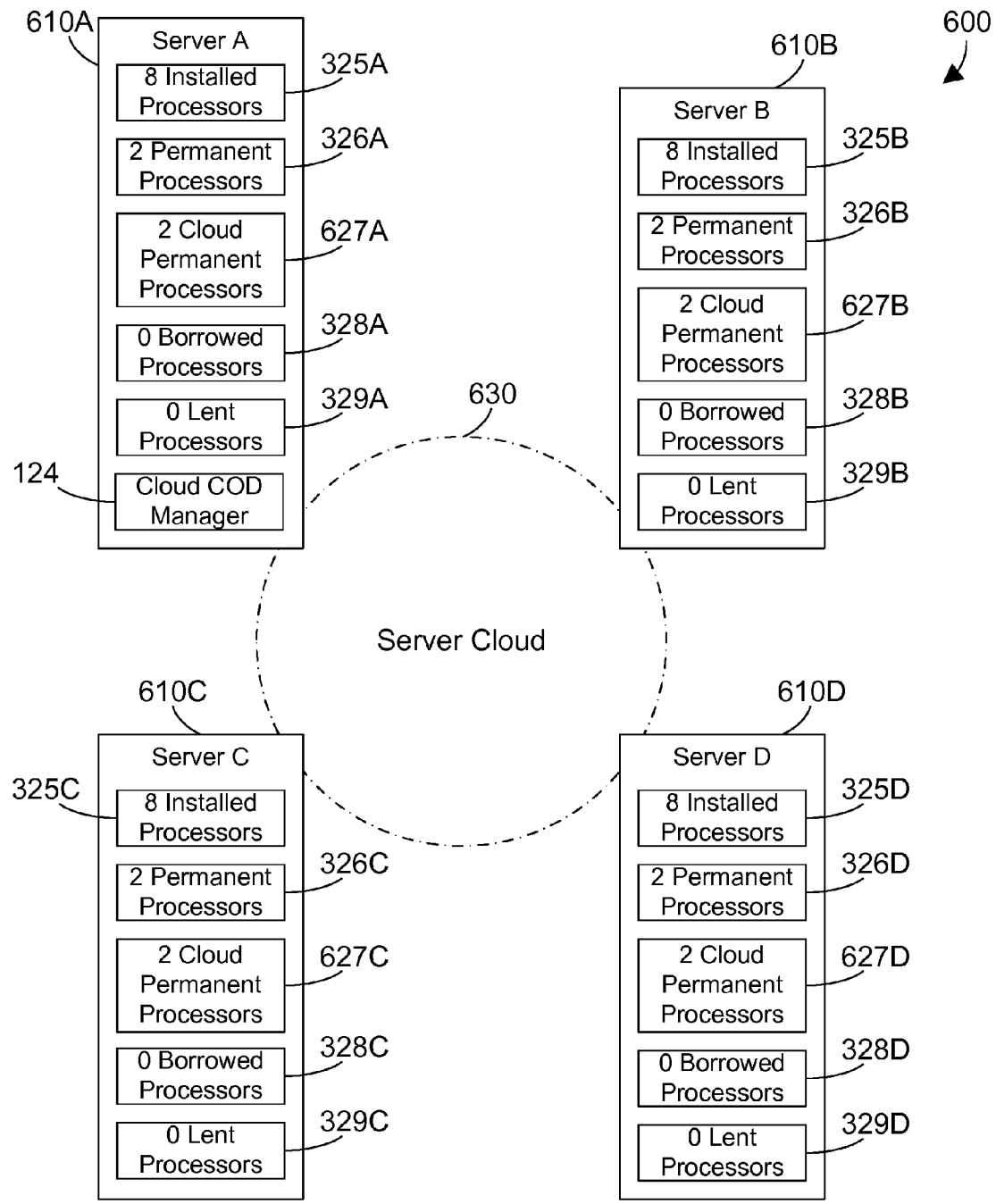
FIG. 6 is a block diagram of a server cloud system that includes cloud permanent processors.

Because the cloud capacity on demand manager 124 may manage capacity across servers in a server cloud, this gives rise to a new concept shown in FIG. 6. Server cloud system 600 includes four servers 610A-610D with the same installed processors 325A-325D, permanent processors 326A-326D, borrowed processors 328A-328D, and lent processors 329A-329D. Servers 610A-610D could each be a server computer system 100 as shown in FIG. 1. In addition, a new concept referred to herein as "cloud permanent processors" is introduced to represent capacity on a server that is permanently enabled and that may be used by any server in the server cloud. For the specific example in FIG. 6, each server 610A-610D includes two cloud permanent processors 627A-627D. These capacity for these cloud permanent processors could be used by any server in the server cloud 630, including the server on which the cloud permanent processors reside.

Figure 7:
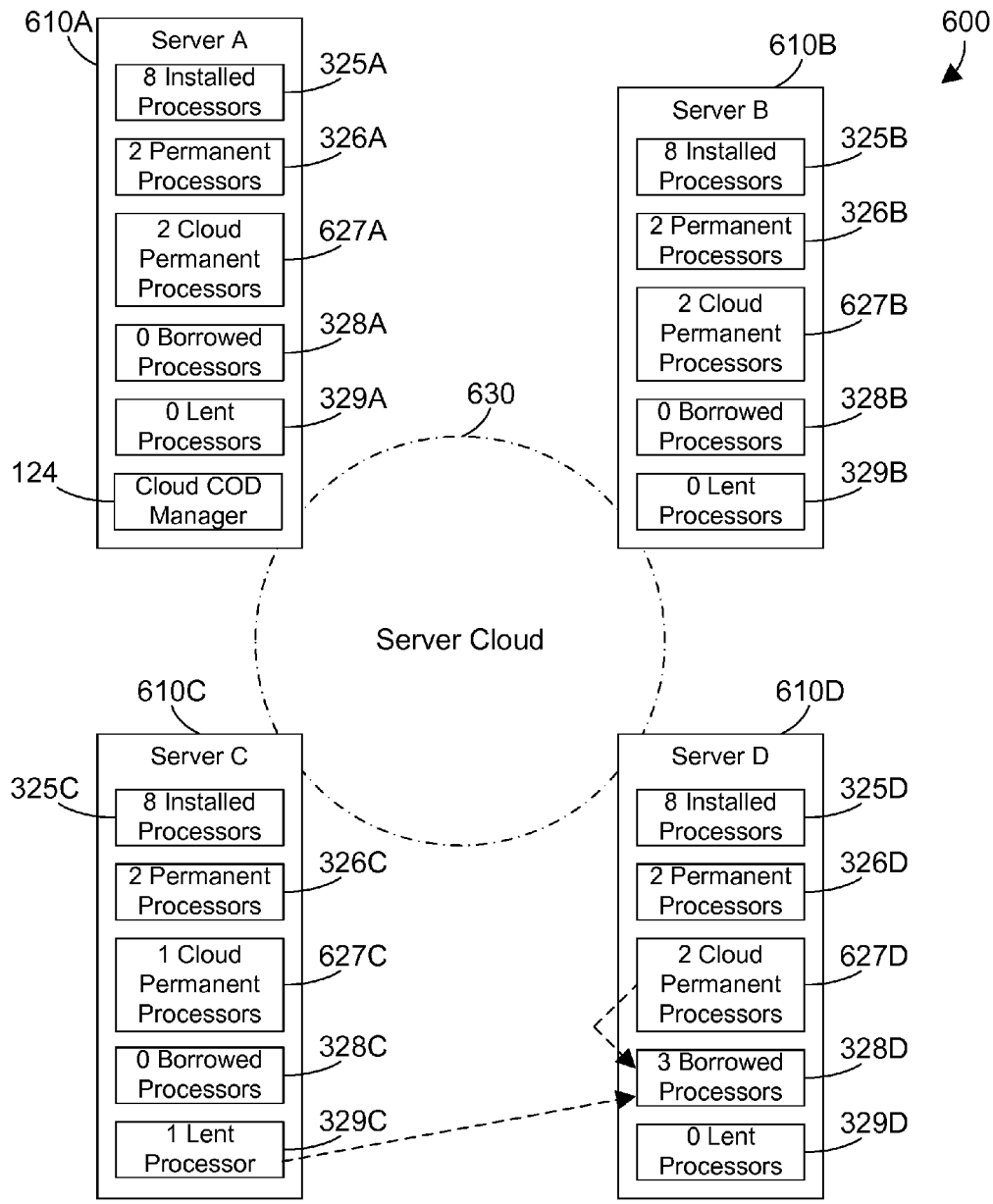
FIG. 7 is a block diagram of the server cloud system shown in FIG. 6 showing capacity shared between servers in the server cloud.

Referring to FIG. 7, we assume the same conditions in FIG. 4 that prompted the borrowing and lending of capacity, namely, server 610D needs three capacity for three more processors. The server 610D may use the two cloud permanent processors 627D, and may borrow the third needed processor from server 610C, as shown by the dotted lines with arrows in FIG. 7. Note the one lent processor 329C on server 610C reduces the number of cloud permanent processors 627C from two to one. By defining this new feature called cloud permanent processors, the cloud capacity on demand manager may have more flexibility regarding which resources are borrowed or lent among servers in the server cloud. For example, the cloud capacity on demand manager 124 could first borrow all cloud permanent processors because they are dedicated to cloud processing before borrowing any permanent processors on a server. In the alternative, the cloud permanent processors could be the only capacity that is allowed to be shared between servers in a server cloud. By having capacity for cloud permanent processors defined separately from permanent processors, the cloud capacity on demand manager 124 has more flexibility in borrowing and lending capacity across a server cloud.

Figure 8:
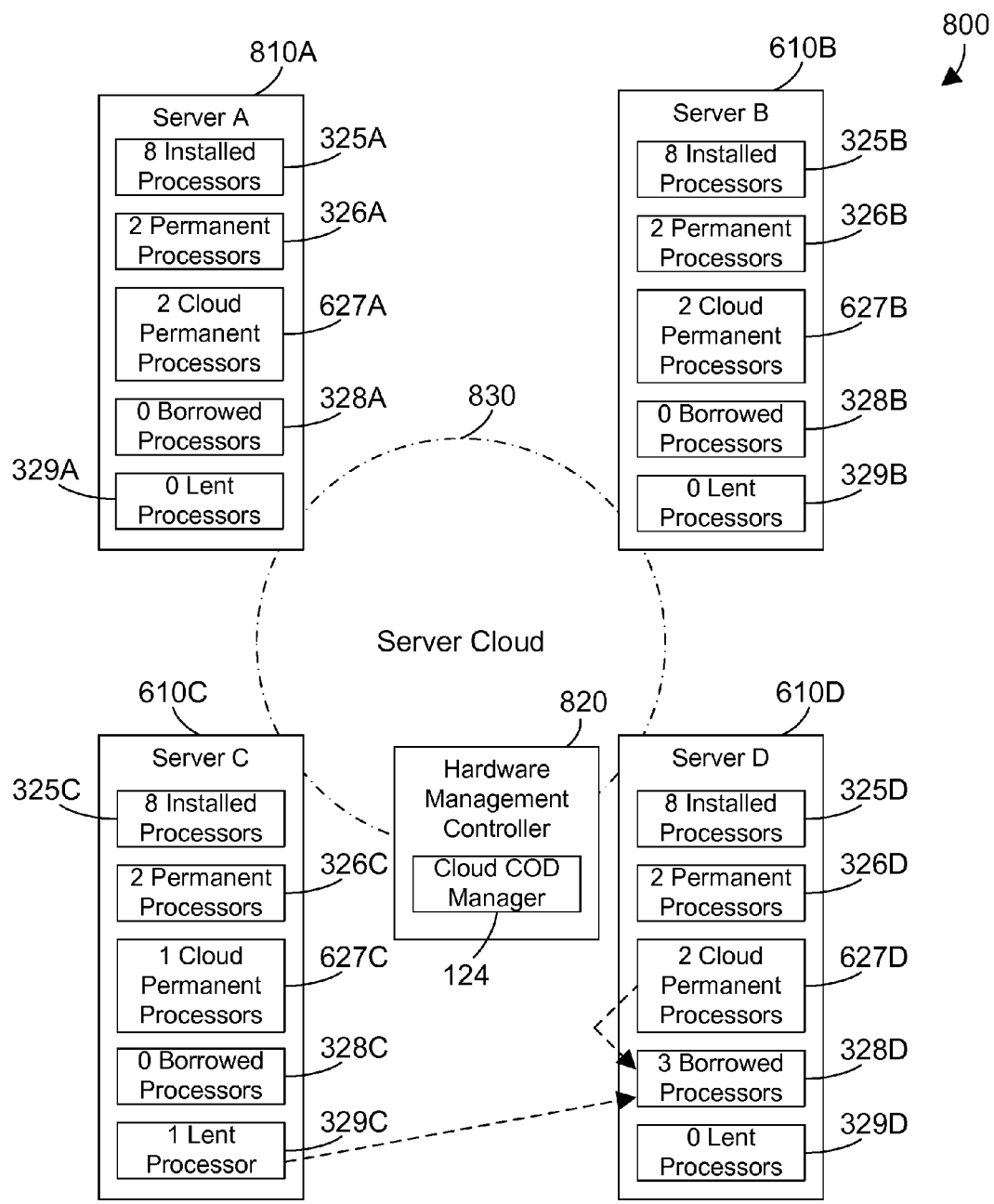
FIG. 8 is a block diagram of a server cloud system that includes the cloud capacity on demand manager in a hardware management console.

In FIGS. 3, 4, 6 and 7, the cloud capacity on demand manager 124 is shown to reside on one of the servers in the server cloud. In an alternative implementation, the cloud capacity on demand manager 124 may reside on a separate entity in the server cloud, as shown in FIG. 8. In server cloud system 800, four servers 810A, 610B, 610C and 610D are interconnected in a server cloud 830. Also connected in the server cloud 830 is a hardware management console 820, which contains the cloud capacity on demand manager 124. The hardware management console 820 allows configuring the servers in the server cloud, and provides a user interface for managing resources and capacity in the servers in the server cloud. The hardware management console 820 can also monitor the servers in the server cloud and can detect when the server cloud is no longer intact. The hardware management console 820 thus provides an independent control point outside of the servers rather than having the servers themselves manage their relationships, which makes it much easier when a server leaves the server cloud. For example, in FIG. 7, if server 610A malfunctions and becomes non-responsive, the cloud capacity on demand manager 124 can no longer do its job. By placing the cloud capacity on demand manager 124 in a separate hardware management console 820 as shown in FIG. 8, the cloud capacity on demand manager 124 may continue to function regardless of which server leaves the server cloud.

Figures 9, 10:
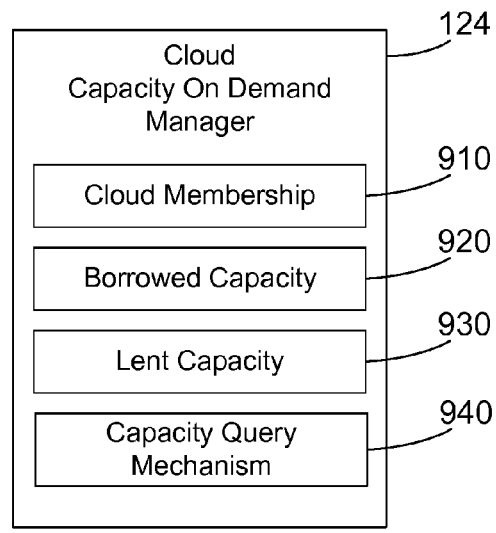
FIG. 9 is a block diagram of one implementation for the cloud capacity on demand manager.
FIG. 10 is a block diagram showing a sample cloud resource table that could be a specific implementation for the borrowed capacity and lent capacity shown in FIG. 9.

Referring to FIG. 9, the cloud capacity on demand manager 124 tracks cloud membership 910, i.e., which servers are members of the server cloud, and tracks borrowed capacity 920 and lent capacity 930. The cloud capacity on demand manager 124 also includes a capacity query mechanism 940 that can query each server in the server cloud to determine whether the server has capacity to lend (see step 540 in FIG. 5). The borrowed capacity 920 and lent capacity 930 may be tracked in any suitable way. For example, the cloud resource table 1010 shown in FIG. 10 represents one suitable way to keep track of borrowed capacity 920 and lent capacity 930. Entry 1020 shows a capacity ID of P3, a resource type of processor, that Server A is the owner of this capacity, and this capacity is not yet lent out. Entry 1030 shows a capacity ID of P14, a resource type of processor, that Server C is the owner of this capacity, and this capacity has been lent to Server D. By keeping track of borrowed capacity and lent capacity, the cloud capacity on demand manager 124 may disable borrowed capacity (step 570 in FIG. 7) when the server cloud is no longer intact. Note that each server preferably includes a mechanism that can detect when the server is no longer in the server cloud, and in response will reclaim any capacity it previously lent out to other servers in the cloud (see step 580 in FIG. 8).

While processors are discussed in the examples above, processors represent one suitable example of resources that have capacity that may be borrowed and lent within a server cloud. The disclosure and claims herein expressly extend to any suitable resources in a server and any suitable resources in a server cloud, including without limitation processors, memory, input/output (I/O) slots, network adapters, etc. Note also that what is being borrowed and lent by the cloud capacity on demand manager is capacity for resources, not the resources themselves. Thus, when server 310D has two permanent processors 326D and three borrowed processors 328D, this means that five of the eight installed processors 325D in server 310D may be used. The "borrowed processors" 328D represent capacity for processor borrowed from other servers. Note the sum of permanent processors and borrowed processors on a server cannot exceed the total number of installed processors.

The disclosure and claims relate to a cloud capacity on demand manager that manages capacity on demand for servers in a server cloud. The cloud capacity on demand manager may borrow capacity from one or more servers and lend the capacity borrowed from one server to a different server in the server cloud. When the server cloud is no longer intact, capacity borrowed from servers no longer in the server cloud is disabled, and servers no longer in the server cloud reclaim capacity that was lent to the server cloud One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. An apparatus comprising:
   at least one permanent hardware processor that is permanently enabled to be used by the apparatus;
   at least one cloud permanent hardware processor that is permanently enabled to any server in a server cloud of which the apparatus is a member;
   a memory coupled to the at least one permanent hardware processor and the at least one cloud permanent hardware processor; and
   a cloud capacity on demand manager residing in the memory and executed by the at least one permanent hardware processor, the cloud capacity on demand manager managing capacity for a plurality of cloud permanent hardware processors for a plurality of servers in a server cloud that includes the apparatus, the cloud capacity on demand manager borrowing capacity for at least one of the plurality of cloud permanent hardware processors from at least one of the plurality of servers in the server cloud and lending the borrowed capacity to a different one of the plurality of servers in the server cloud as long as the server cloud is intact, and when the server cloud is no longer intact, the cloud capacity on demand manager disables borrowed capacity and reclaims lent capacity.

2. The apparatus of claim 1 wherein at least one of the plurality of servers includes cloud permanent capacity configured to be shared with any other server in the server cloud, wherein the cloud permanent capacity is capacity permanently enabled on the one of the plurality of servers in the server cloud configured to be shared with other servers in the server cloud.

3. The apparatus of claim 1 wherein when the server cloud is no longer intact due to one of the plurality of servers no longer being in the server cloud, the cloud capacity on demand manager disables all borrowed capacity from all of the plurality of servers and reclaims all lent capacity from all of the plurality of servers.

4. The apparatus of claim 1 wherein when the server cloud is no longer intact due to one of the plurality of servers no longer being in the server cloud, the cloud capacity on demand manager disables borrowed capacity borrowed from the one server, reclaims lent capacity on the one server, and retains other borrowed capacity and lent capacity for a plurality of servers that are still in the server cloud.

5. An article of manufacture comprising software stored in a non-transitory computer readable storage medium, the software comprising:
   a cloud capacity on demand manager that manages capacity for a plurality of cloud permanent hardware processors for a plurality of servers in a server cloud, wherein each of the plurality of servers comprises at least one permanent hardware processor that is permanently enabled to be used by the server and at least one cloud permanent hardware processor that is permanent enabled to any of the plurality of servers in the server cloud, the cloud capacity on demand manager borrowing capacity for at least one of the plurality of cloud permanent hardware processors from at least one of the plurality of servers in the server cloud and lending the borrowed capacity to a different one of the plurality of servers in the server cloud as long as the server cloud is intact, and when the server cloud is no longer intact, the cloud capacity on demand manager disables borrowed capacity and reclaims lent capacity.

6. The article of manufacture of claim 5 wherein at least one of the plurality of servers includes cloud permanent capacity configured to be shared with any other server in the server cloud, wherein the cloud permanent capacity is capacity permanently enabled on the one of the plurality of servers in the server cloud configured to be shared with other servers in the server cloud.

7. The article of manufacture of claim 5 wherein when the server cloud is no longer intact due to one of the plurality of servers no longer being in the server cloud, the cloud capacity on demand manager disables all borrowed capacity from all of the plurality of servers and reclaims all lent capacity from all of the plurality of servers.

8. The article of manufacture of claim 5 wherein when the server cloud is no longer intact due to one of the plurality of servers no longer being in the server cloud, the cloud capacity on demand manager disables borrowed capacity borrowed from the one server, reclaims lent capacity on the one server, and retains other borrowed capacity and lent capacity for a plurality of servers that are still in the server cloud.

9. An apparatus comprising:
- at least one permanent hardware processor that is permanently enabled to be used by the apparatus;
- at least one cloud permanent hardware processor that is permanently enabled to any server in a server cloud of which the apparatus is a member, wherein the at least one cloud permanent hardware processor may be shared with any other server in the server cloud;
- a memory coupled to the at least one permanent hardware processor and the at least one cloud permanent hardware processor; and
- a cloud capacity on demand manager residing in the memory and executed by the at least one permanent hardware processor, the cloud capacity on demand manager managing capacity for a plurality of cloud permanent hardware processors for a plurality of servers in a server cloud that includes the apparatus, the cloud capacity on demand manager borrowing capacity for at least one of the plurality of cloud permanent hardware processors from at least one of the plurality of servers in the server cloud and lending the borrowed capacity to a different one of the plurality of servers in the server cloud as long as the server cloud is intact, and when the server cloud is no longer intact due to one of the plurality of servers no longer being in the server cloud, the cloud capacity on demand manager disables borrowed capacity borrowed from the one server, reclaims lent capacity on the different one server, and retains other borrowed capacity and lent capacity for a plurality of servers that are still in the server cloud.

\* \* \* \* \*